Figure 1:
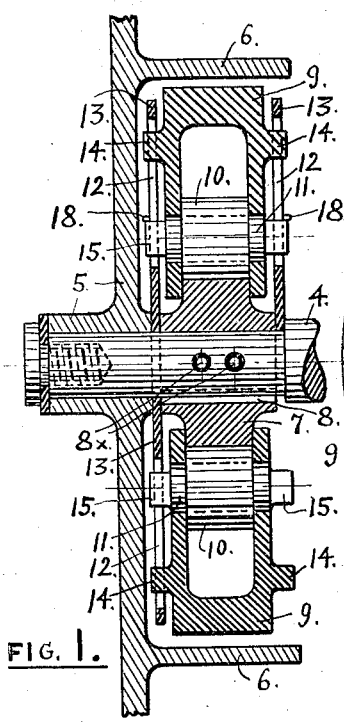

H. F. WALLMANN.
FRICTION COUPLING.
APPLICATION FILED JUNE 1, 1908.

1,045,480.

Patented Nov. 26, 1912.

2 SHEETS—SHEET 1.

WITNESSES:
J. A. Adams
J. H. Chesmeour

INVENTOR:
Henning Friedrich Wallmann

H. F. WALLMANN.
FRICTION COUPLING.
APPLICATION FILED JUNE 1, 1908.
1,045,480.
Patented Nov. 26, 1912.
2 SHEETS—SHEET 2.
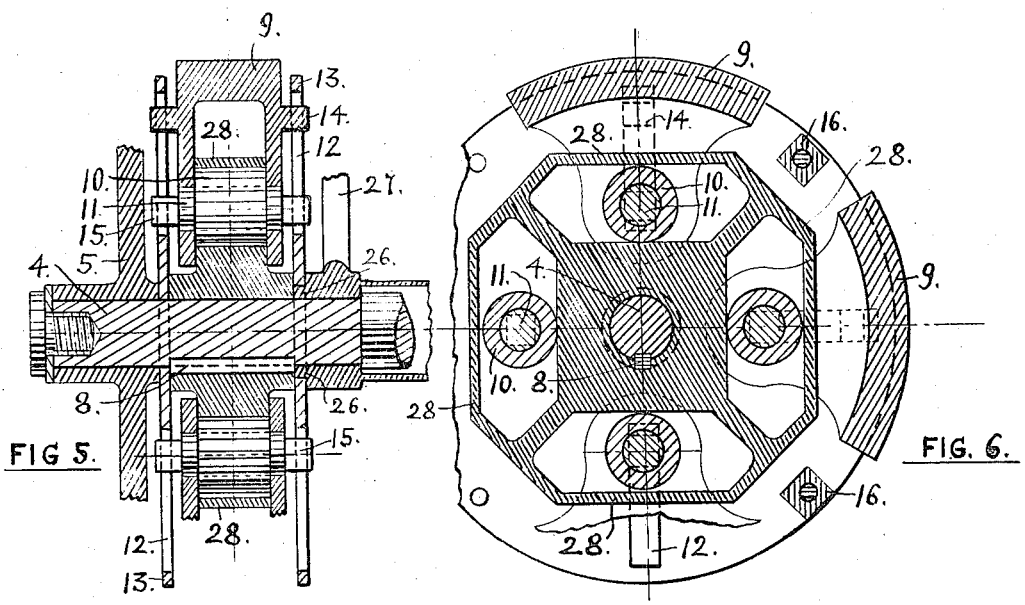
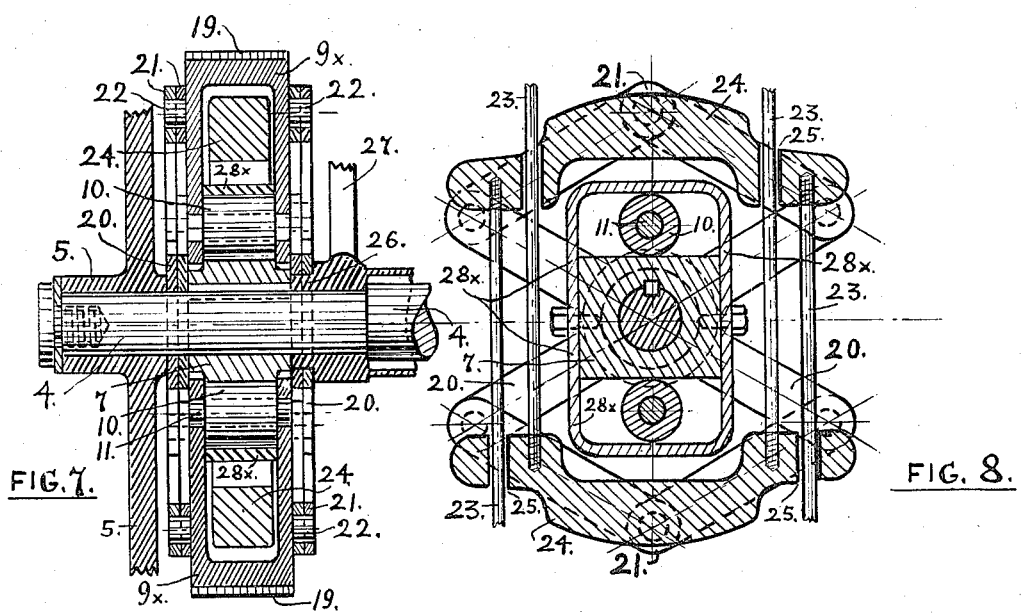
WITNESSES:
J. A. Adams
L. J. Goulet
INVENTOR:
Henning Friedrich Wallmann

UNITED STATES PATENT OFFICE.

HENNING FRIEDRICH WALLMANN, OF CHICAGO, ILLINOIS.

FRICTION-COUPLING.

1,045,480.

Specification of Letters Patent. Patented Nov. 26, 1912.

Application filed June 1, 1908. Serial No. 436,127.

*To all whom it may concern:*

Be it known that I, HENNING FRIEDRICH WALLMANN, a citizen of the United States of America, and resident of Chicago, county of Cook, State of Illinois, have invented a certain new and useful Friction-Coupling, of which the following is a description, reference being had to the accompanying drawings, forming a part of this specification, in which similar letters and numerals of reference indicate similar parts.

My invention relates to mechanisms for transmitting rotary motion by means of clutch-shoes from driving to driven members of machinery separately journaled to rotate about the same, in most cases horizontal, axis, and more particularly to such mechanisms of this kind in which the centrifugal force developed by the rotating clutch-shoes is counteracted by the tension of springs. The horizontal position of the axis causes a varying influence of gravitation on the motion of the clutch-shoes, and the function of the latter is impeded and in many cases frustrated by such varying influence of gravitation. Another disadvantage of the known mechanism of this kind is caused by the variation in the amount of centrifugal force developed by the rotation of the clutch-shoes at different angular velocities, as it is difficult and perhaps impossible to provide certain springs which for all different amounts of centrifugal force produce a good result.

The objects of my invention are, first, to provide means for eliminating the varying influence of gravitation on the motion of the clutch-shoes which varying influence is caused by the horizontal position of the axis; second, to preferably counterbalance the weight of each clutch-shoe by the weight of another clutch-shoe and to thus perfectly eliminate the influence of gravitation; third, to either separate the influence of inertia and of centrifugal force on the motion of the said clutch-shoes in such a way that the influence of the latter force becomes small and can be easily overcome by the tension of a small spring or of small springs, or to preferably provide an arrangement by the employment of which the centrifugal force exerted by the clutch-shoe is more or less balanced by centrifugal force exerted in the opposite direction by a solid body connected to the clutch-shoe so as to make the employment of a spring or of springs unnecessary. In either case it is my object to make the influence of inertia on the motion of the clutch-shoes comparatively great in order to effect without fail an increase or a reduction of the angular velocity of the driven mechanical element in correspondence with a varied angular velocity of the driving member of machinery, and fourth, to provide better means for effecting an engagement of the clutch-shoes at any time when desirable and for keeping the clutch-shoes out of engagement at other times. Some known mechanisms of this kind are based on the principle that the clutch-shoe by the combined power of inertia and centrifugal force is thrown into an engagement against the tension of a spring which tension is made stronger than the developed centrifugal force alone, and which tension prevents, whenever the clutch-shoe for any cause is put out of engagement, a renewed engagement as long as the driving member revolves at a uniform angular speed and does not act against the inertia of the clutch-shoe for overcoming the tension of the spring. If, for instance, two such mechanisms are employed for propelling the two driving wheels of a motor-driven vehicle and if the clutch-shoes propelling one of the two driving wheels are for any cause temporarily thrown out of engagement, these clutch-shoes do not reëngage after this cause is removed as long as the axle revolves at a uniform speed, and the vehicle is propelled by the other driving wheel alone until the axle changes its speed and thereby reëngages the clutch-shoes of the first driving wheel. This action of the mechanism is generally not observed from the outside, because the front—and steering wheels of the vehicle determine anyhow the course of the latter as well in the case where the vehicle is propelled by one of the two rear driving wheels and in the case where it is propelled by both of these wheels, but this propulsion at one side only is the cause of a considerable loss of power and the cause of considerable wear of the movable parts of the vehicle.

By my improvement the wheel becomes free from the clutch-shoes and the axle at the instant that this becomes necessary or desirable for any cause, and the clutch-shoes are reëngaged at the instant that this cause ceases to exist. I attain these objects by providing guides for the motion of the clutch-shoes in such a way either that their weight can not have any influence on their motion otherwise than in a radial direction, or preferably that the influence of the weight of one clutch-shoe is compensated and balanced by the influence of the weight of another clutch-shoe. Preferably in connection with such guides, I employ centripetal counterpoises for more or less balancing the centrifugal force developed by the rotating clutch-shoes and preferably in connection with such guides and centripetal counterpoises, I employ peculiar cams which allow of the clutch-shoes entering into a clutching engagement with the driven member at two different positions but prevent a clutching engagement therewith in an intermediate position. Furthermore, I preferably provide means for a frictional engagement between one or several of the said guides and a non-revolving solid body for retarding the angular velocity of the said guides and the clutch-shoes in connection therewith.

Figure 2:
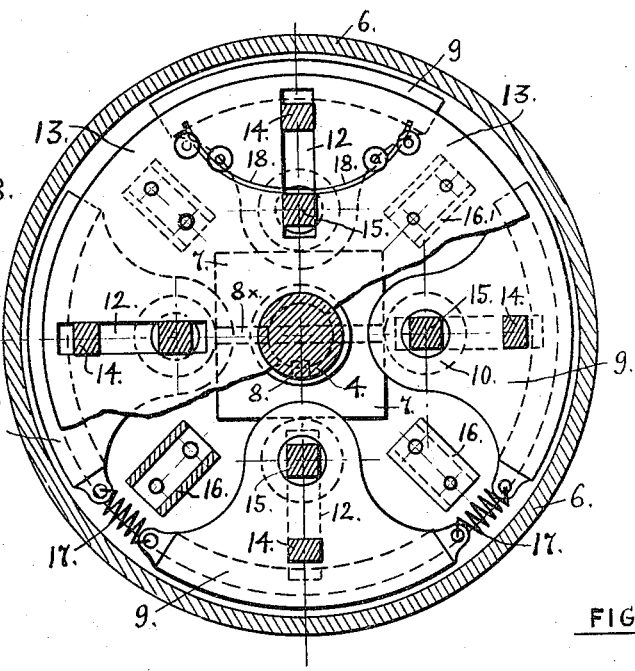
Figure 3:
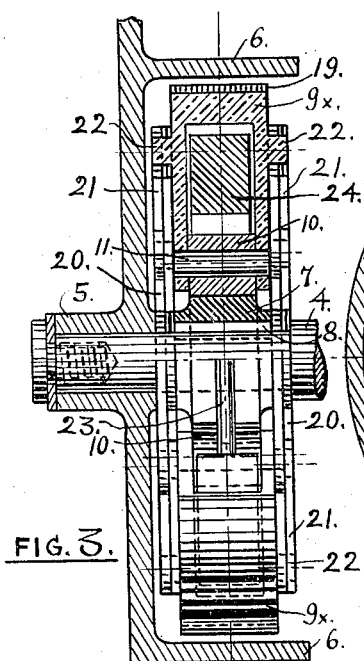
Figure 4:
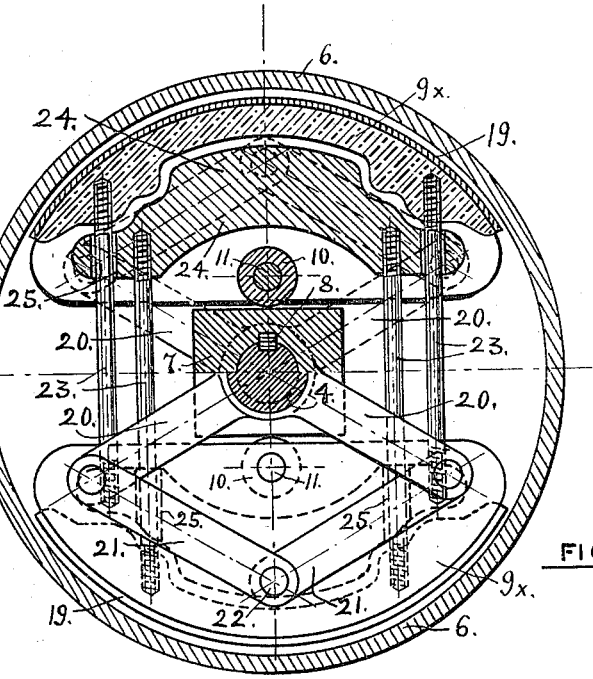

In the drawing: Figure 1, is a section through the center of one form of my coupling, Fig. 2 is a side-view of the same parts being broken off for the sake of greater clearness, Fig. 3 is in its upper part a section through the center line of my preferred form of coupling and its lower part a front-view of its interior parts, Fig. 4 is in its upper part a section through the centerline of Fig. 3, and in its lower part a side-view of Fig. 3. Figs. 5 and 6 illustrate one form of my peculiar cam and Fig. 5 shows also means for frictionally retarding the motion of the rotary guides and clutch-shoes, and Figs. 7 and 8 illustrate my preferred form of cam and Fig. 7 shows also means for frictionally retarding my preferred form of guides and clutch-shoes.

The drawings represent the special case of coupling the hub 5, of one of the driving wheels of a motor-driven vehicle to its axle 4 on which it is loosely journaled but properly kept length-wise thereon. A substantially circular clutch-drum or clutch-rim 6 is rigidly connected to the driving wheel or its hub 5 or made integral therewith. A cam or disk with a non-circular periphery preferably of the shape of a square or oblong rectangle 7 as shown, or a cam of the shape of an equilateral triangle, is rigidly fastened by a key 8 or pins 8ˣ or in some other suitable way to the axle 4. Between the cam 7 and the surrounding clutch-rim 6 are loosely mounted the clutch-shoes 9 or 9ˣ resting by means of fulcrums or preferably antifriction-rollers 10 on the circumference of the cam 7.

The antifriction rollers 10 are journaled on axes 11 substantially parallel with and equally distant from the shaft 4. Each of these axes 11 is connected to projections or side-walls of the clutch-shoes 9 or 9ˣ as is clearly shown in Fig. 1 and Fig. 3. Instead of antifriction-rollers, metal blocks of any suitable shape may be journaled on the axes 11 and have a sliding motion on the surface of the cam 7 in order to distribute the pressure transmitted from the cam to the clutch-shoe over a greater surface in the case that this pressure is so great as to deform the shape of the antifriction-roller and of that part of the cam surface it rests on. In Fig. 1 and Fig. 2 the ends 15 of the axes 11 are made square forming shoulders and extending into slots 12 forming corresponding guide-shoulders within plates 13 which are loosely journaled on the shaft 4. The clutch-shoes 9 are provided with square shaped projections or shoulders 14 which also extend into the slots 12 which form guides for the ends 15 of the axes 11 and the projections or shoulders 14 and thereby for the clutch-shoes 9 the full extent of the clutch-surface of which is in this way always kept in an almost parallel position to the clutch-surface on the inner periphery of the clutch-rim 6, and this full extent thereof uniformly and simultaneously either comes into contact therewith or is drawn back therefrom.

Instead of providing the axes 11 with square ends 15, each clutch-shoe may be provided on each side with two projections or shoulders 14 which both may extend into one guide-slot 12 or which may extend into two separate parallel guide-slots provided in each of the two plates 13. The latter plates are kept in their relative position and fastened to each other by metal pieces 16 which may be of light construction as shown in Fig. 2, but the weight of which and of the metal plates 13, may be sufficiently increased in order to attain any desired amount of inertia. Springs 17 or 18 counteract the centrifugal force produced by the revolving clutch-shoes 9 and rollers 10, but the centrifugal force produced by the revolving plates 13 and metal blocks 16 is directly taken up and counteracted by the resistance of the shaft 4. The springs 17 are connected at their ends to adjacent clutch-shoes near the periphery of the latter so as to tend to hold the shoes in definite relations to each other. The springs 18 are indicated as being bowed and bearing at their centers upon the ends 15 of the axes or trunnions 11 and at their ends against fixed stops on the plates 13, thereby preventing the clutch-shoes from moving outwardly without placing the springs under tension or under greater tension. Whenever the angular velocity of the latter and of the cam 7 is increased or reduced at times when the clutch-shoes 9 are disengaged from the clutch-drum or rim 6 and are in or near their normal central position relative to the cam 7, the inertia of the rollers 10, of the clutch-shoes 9, of the plates 13 and of the metal blocks 16 in addition to the centrifugal force produced by the weight of the revolving clutch-shoes 9 and rollers 10, tends to move these rollers against the resistance of the springs 17 or 18 out of their normal central position on the cam 7 either backwardly or forwardly in opposition to the speed-increase or speed reduction respectively, and relatively to the direction of the motion of the shaft 4, but whenever the motion of the shaft 4 is uniform and the clutch-shoes are not wedged in between the cam 7 and the clutch-drum 6, the springs 17 or 18 have to overcome the centrifugal force of only the revolving rollers 10 and clutch-shoes 9 in order to remove the latter from the clutch-drum 6 toward their central position relative to the cam 7. This shows that by the use of light clutch-shoes and rollers in connection with heavy guide-plates 13 and heavy metal blocks 16, the apparatus can be made sensitive to any desired degree.

In Figs. 3 and 4 I have shown only two clutch-shoes $9^x$ and the cam accordingly may have the shape of an oblong rectangle. The clutch-shoes $9^x$ may be made of some light metal, preferably of an alloy of aluminum protected at its clutch surface by a steel-plate 19. In place of the plates 13 are substituted two double-parallelograms consisting of the links 20 and 21 properly connected to each other. The links 20 are loosely journaled on the shaft 4 whereas the links 21 are connected by means of pivots 22 to the clutch-shoes $9^x$ and are pivotally connected at their ends to the links 20. The weight of each clutch-shoe is thus perfectly balanced by the weight of the other clutch-shoe. Each of the clutch-shoes $9^x$ is also connected by means of rods 23 to a heavy metal body 24 placed at the opposite side of the shaft 4. This metal body 24, preferably made of lead, is so heavy as to produce almost the same, and in some cases even greater amount of centrifugal force than the light clutch-shoe $9^x$, to which it is rigidly connected. The revolving body 24 tends therefore to move the clutch-shoe $9^x$ from the clutch-rim 6 in a radial direction toward the center-line of the shaft 4 and may consequently be called a centripetal counterpoise. Each of these centripetal counterpoises 24 is provided with guide-holes 25 for guiding in true parallel direction, the rods 23 connecting the adjacent clutch-shoe with its centripetal counterpoise on the opposite side of the shaft.

The mechanism is shown in the position in which the driven mechanical elements viz: the clutch rim 6 and the hub 5 are free to rotate independently of the driving mechanical elements viz: the axle 4, the cam 7, the rollers 10, the clutch-shoes 9 or $9^x$, the guides for the clutch-shoes and the centripetal counterpoises 24. This is the central position which corresponds to the position of the mechanism when the vehicle wheel is rotated through contact with the roadbed at a greater angular speed than that of the shaft 4, as long as the speed of this shaft is constant. From the foregoing however, it becomes obvious that unless the speed of the shaft 4 is varied or unless some positive centrifugal force is developed by the rotating clutch-shoes, there is no effective power to throw the clutch-shoes 9 or $9^x$ into frictional engagement with the clutch-rim 6.

If both driving wheels are loose from the shaft 4 the motor driving the latter having no actual work to do, naturally increases its velocity and thereby causes a renewed frictional engagement of all the clutch-shoes by acting against their inertia. This will take place if the road bed is rough or if the vehicle turns first a corner on one hand and then turns a corner on the other hand, but in order to cause a frictional engagement of each driving wheel independently of the other driving wheel, I provide a device for retarding the rotary motion of the not engaged clutch-shoes and the rotary parts connected therewith by placing one of the guides 13 or two of the links 20 on a non-revolving bushing 26 surrounding the shaft 4 and held in place by a connection 27 to the non-revolving parts of the vehicle or stationary surroundings of the coupling, and by fastening to the cam 7, a frame 28 or $28^x$, preventing the rollers 10 from leaving the circumference of the cam 7, as is illustrated in Figs. 5 to 8. From this it will be understood that the clutch-shoes 9 or $9^x$ are prevented in their central position on the circumference of the cam 7, from entering into any frictional engagement with the clutch-surface of the rim 6, but that they may enter into such engagement if the fulcrums 11 leave their central position on the cam 7. As a part of the weight of the clutch-shoes 9 or $9^x$ and of the metal bodies connected thereto rests on the guides 13 or on the links 20 and thereby on the bushing 26, a sufficient amount of friction will be created on the circumference of the latter for retarding the rotary motion of the clutch-shoes so that their rollers leave their central position on the cam 7 and cause a frictional engagement without the assistance of any centrifugal force which may be perfectly eliminated by the centripetal counterpoises 24.

The way of operation of the mechanism will be understood by assuming that the axle 4 is started to rotate at a greater angular speed than that of the wheel. The inertia of the clutch-shoes 9 or $9^x$, of the rollers 10, of the guides 13 or 20 and 21, of the weights 16 or of the centripetal counterpoises 24, tends to hold them stationary, and the rollers 10 accordingly roll on the circumferential surface of the cam to places of greater distance from the centerline of the axle 4 against the small pressure of the springs 17 or 18 or of the centripetal force of the counterpoises 24 until the clutch-shoes 9 or 9× come into contact with the clutch-rim 6 and are wedged against the latter regardless of the direction of the rotation of the shaft 4. If the speed of the latter is reduced or if the latter is operatively connected to reversing means the clutch-shoes 9 or 9× and the rim 6 are instantly disengaged by the over running wheel, and the springs 17 and 18 or the centripetal counterpoises 24 as well as the inertia of the disengaged clutch shoes 9 or 9×, of the rollers 10, of the guides 13 or 20 and 21, of the weights 16 or of the counterpoises 24 instantaneously draw the clutch shoes 9 or 9× and the appertaining mechanical members into their central, neutral position with respect to the cam 7. However, there is a difference between the effect of the force exerted by the said springs or by the said counterpoises and the effect of the said inertia. The centripetal force of the springs of the counterpoises cannot effect a motion of the clutch shoes past their central position with respect to the cam 7, i. e. past the position occupied by the center of gravity of the clutch shoes when in greatest proximity to the axis of the shaft 4, whereas the inertia tends to move the clutch shoes 9 or 9× and the appertaining mechanical members with their uniform velocity, attained in their previous and momentary direction of rotation, past their central, neutral position relative to the cam 7 as far as they can go with respect to the relatively retarded axle and against the centripetal force of the springs 17 or 18 or of the counterpoises 24; i. e. until parts of the cam faces located on opposite sides of the neutral zone thereof, with respect to the previous positions of clutching engagement, effect a new clutching engagement of the clutch shoes with the rim 6 which also revolves with relatively greater angular velocity in the previous and momentary direction of rotation than the relatively retarded shaft 4 and which tends to impart to the latter its own speed and direction of rotation at the instant that the new clutching engagement is effected. At this instant the mechanical members entering into a clutching engagement have a tendency to move at different velocities or in a special case at equal velocities but in opposite directions and brake each other by the new clutching engagement until the motion of the wheel and of the rim 6 has become conformed to the motion of the relatively retarded shaft 4. If, however, for any cause, such as passing around a corner, unequal inflation of the tires, uneven distribution of load between the two wheels, or irregularities of the roadbed, a wheel tends to travel faster than it is driven by the axle revolving at constant speed, the clutch-shoes 9 or 9× will instantly be disengaged from the rim 6, and the springs 17 or 18 or the centripetal counterpoises 24, or the frames 28 or 28×, by drawing or guiding the roller 10 toward the central positions on the circumference of the cam 7, will leave the wheel free to rotate independently of the shaft 4 and the cam 7 thereon, provided that and as long as this shaft with its cam revolves at a uniform speed. However as the friction on the bushing 26 or a small amount of centrifugal force keeps the clutch-shoes 9 or 9× near the clutch surface of the rim 6, a renewed frictional engagement immediately takes place as soon as the angular speed of the wheel becomes equal to or lags to the slightest degree behind the angular speed of the shaft 4.

It will be noticed that in case that the wheel overruns with the angular velocity of the shaft remaining constant, no inertia of the clutch shoes and of the appertaining mechanical members exists which might tend to move the clutch shoes first into and then beyond their central, neutral position relative to the cam 7 into a clutching engagement with the rim 6 and with parts of the cam-faces on opposite sides of the neutral zones thereof with respect to the position of their previous clutching engagement. In this case with the speed of the shaft remaining constant, it is only on account of the springs, centripetal counterpoises, &c., that the clutch shoes and appertaining mechanical members move toward and possibly into their central neutral position relative to the cam 7, but they will not move past this position unless the angular velocity of the shaft 4 is retarded.

What I claim as my invention and desire to secure by Letters Patent is:

1. In a clutch-mechanism, a cam, a clutch-drum and a guide separately revoluble about the same axis, a clutch-shoe movable from and toward the said axis and radially relative to the said guide between the said cam and the said drum, and a shoe-bearing-member pivotally connected to the said shoe and in engagement with the said cam, parts of the latter, of the said drum, of the said shoe and of the said bearing member being movable within the same identical cross-section perpendicular to the said axis for transmitting pressure from some to other of the said parts.

2. In a clutch-mechanism, a cam, a clutch-drum and a guide separately revoluble about the same axis, a clutch-shoe movable radially in relation to the said guide between the said cam and the said drum and having a clutch face, two side-walls of the said shoe supporting the said clutch-face and pivotally supporting between them a bearing member for engagement with the said cam, and a member adapted to counteract the weight and the centrifugal force of the said clutch-shoe.

3. In a clutch-mechanism, a cam, a clutch-drum and two guides separately journaled for rotation about the same axis, a clutch-shoe movable radially in relation to the said two guides between the said cam and the said drum and having a clutch-face, two side-walls of the said shoe supporting the said clutch-face and pivotally supporting between them a bearing member for engagement with the said cam, each of the said two side-walls being provided with shoulders in sliding contact with corresponding shoulders of one of the said guides, and a member adapted to counteract the weight and the centrifugal force of the said clutch-shoe.

4. In a clutch-mechanism, a cam, a clutch-drum and a guide separately revoluble about the same axis, a clutch-shoe movable radially in relation to the said guide between the said cam and the said drum and having a clutch-face, two side-walls of the said shoe supporting the said clutch-face and pivotally supporting between them a bearing member for engagement with the said cam, and a centripetal counterpoise for counteracting the centrifugal force of the said clutch-shoe.

5. In a clutch mechanism, a cam, a clutch-drum and a radial guide separately revoluble about the same axis, a clutch-shoe movable radially relative to the said guide between the said cam and the said drum and having a clutch-face, two side-walls of the said shoe supporting the said clutch-face and pivotally supporting a shoe-bearing for engagement with the said cam, and a cam-guide between the said two sidewalls in rigid connection with the said cam and adapted to guide the said shoe-bearing.

6. In a clutch-mechanism, a cam, a clutch-drum and two radial guides separately journaled for rotation about the same axis, said cam having a cam face, a clutch-shoe movable radially relative to the said guides between the said cam and the said drum and having a clutch-face, two side-walls of the said shoe supporting the said clutch-face and pivotally supporting a shoe-bearing for engagement with the said cam, and a cam-guide between the said two sidewalls in rigid connection with the said cam and parallel to the said cam face for guiding the said shoe-bearing.

In testimony whereof I have signed my name to this specification in the presence of two subscribing witnesses.

HENNING FRIEDRICH WALLMANN.

Witnesses:
GRACE WALKER,
JAMES A. ADAMS.